May 26, 1970          H. T. YOUNG          3,513,638
FILTER
Filed March 8, 1968          3 Sheets-Sheet 1
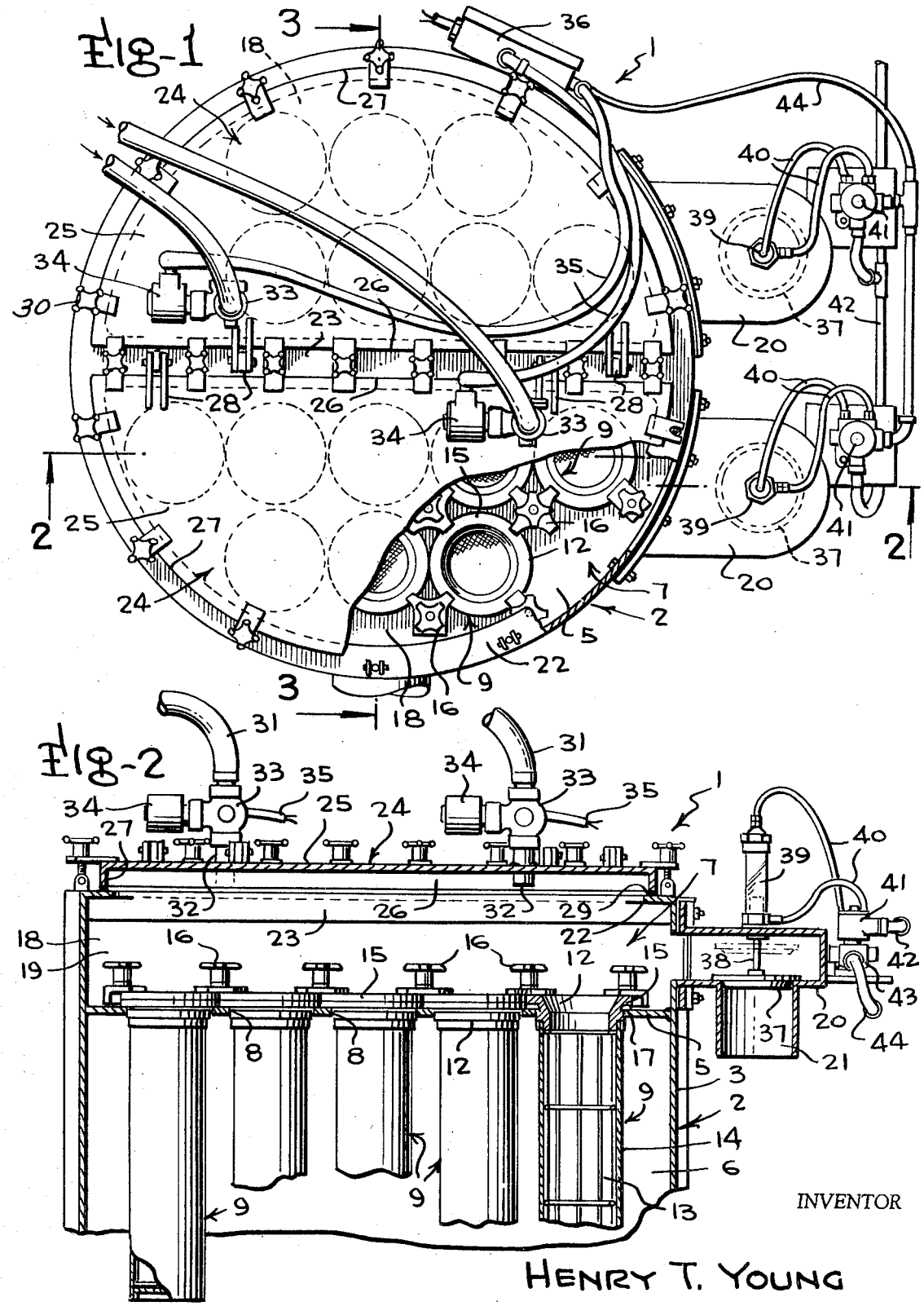
INVENTOR
HENRY T. YOUNG
BY Mason, Fenwick & Lawrence
ATTORNEYS

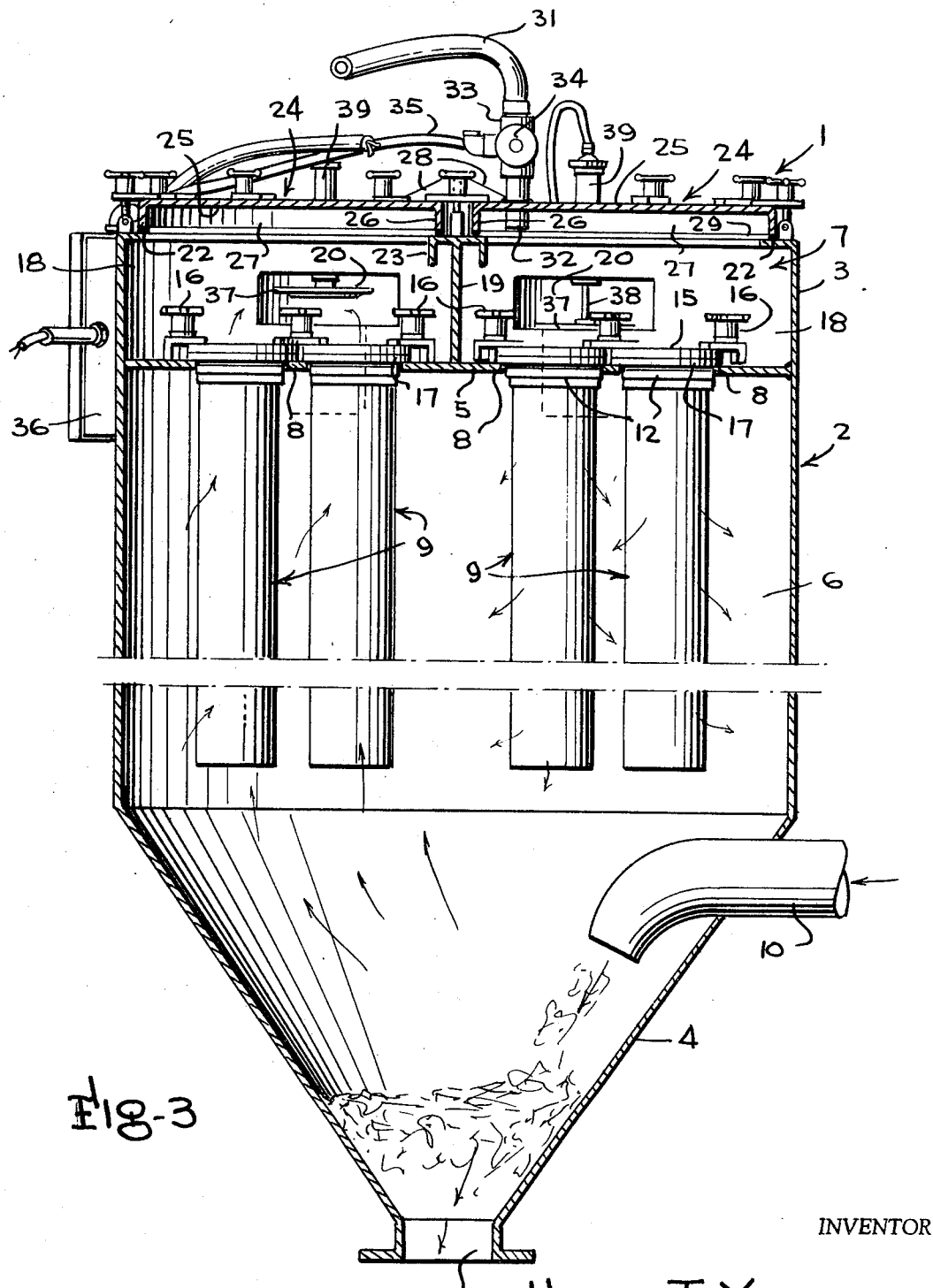

INVENTOR
HENRY T. YOUNG
BY
Mason, Fenwick & Lawrence
ATTORNEYS

United States Patent Office 3,513,638
Patented May 26, 1970

3,513,638
FILTER
Henry T. Young, R.D. 2, Muncy, Pa. 17756
Filed Mar. 8, 1968, Ser. No. 711,672
Int. Cl. B01d 46/04
U.S. Cl. 55—273                                    2 Claims

ABSTRACT OF THE DISCLOSURE

Filter collector having a plurality of porous filter bridging passages from a particle laden fluid receiving chamber to a plenum chamber, wherein the plenum chamber is in sections, with groups of filter elements communicating with each section. There is a valved fluid outlet from each plenum section and a valved backwash fluid inlet to each section, with a timer to close the fluid outlet and open the backwash fluid inlet and reverse for each of the sections in sequence. The backwash inlets, in one disclosed form, are located in doors over the separate plenum sections allowing removal with the doors for changing filters. In another form, the inlets are in removable manifolds which extend across each plenum section.

Background of the invention

This invention relates to filter collectors, and particularly to such devices having means to periodically clean the filter elements.

One type of filter collector in common usage has a receiving chamber into which particle laden air is discharged, with a plurality of filter tubes projecting into the chamber. The tubes are supported upon a tube sheet which separates the receiving chamber from a plenum chamber. Air is drawn into the plenum chamber from the receiving chamber through the filter tubes, and the particles either adhere to the filter surfaces or drop to the bottom of the receiving chamber for collection. Periodically, it is necessary to remove adhered particles from the tubes to preserve full filtering efficiency. This has been done by shaking the tubes, traversing them from the inside by an air jet and by injecting a high pressure blast of air into the top of each tube to backwash the tube while it is in operation. Prior practices require complicated mechanisms for shaking and air traversing, and individual jets and multiple air valves for backwashing the individual tubes while the others of the filter bank remain in operation. Individual backwashing also requires relatively high pressure air. Where individual jets, valves, etc. are used, problems of removal of this equipment arise when it is necessary to replace one or more filter tubes.

Summary of the invention

The general object of the present invention is to provide an improved filter collector wherein the filter cleaning will not be subject to the above mentioned difficulties.

A more specific object is the provision of means to close off the normal filter flow through groups of filters in sequence, and backwash each group as a unit from a single backwashing air source.

Another object is to provide a filter collector having the filter tubes arranged in groups, with the filters of each group being simultaneously accessible for replacement without interference from backwashing tubes, valves, etc.

A further object of the invention is to provide a filter collector wherein normal filter flow through selected groups of filter elements is cut off and then backwashed to permit the use of relatively low pressure backwashing air.

Yet another object is to provide a filter collector wherein the normal filter flow through selected groups of filter elements, is cut off, and the separate filter elements of the cut off group are backwashed by individual jets of relatively low pressure air.

Other objects of the invention will become apparent from the following description of one practical embodiment thereof, when taken in conjunction with the drawings which accompany, and form part of, this specification.

Brief description of the drawings

FIG. 1 is a top plan view of a filter collector embodying the features of the present invention, parts being broken away to show interior structure;

FIG. 2 is a vertical section through the upper part of the filter collector, and is taken on the line 2—2 of FIG. 1;

FIG. 3 is a vertical section through the filter collector, taken at right angles to FIG. 2 and substantially on the line 3—3 of FIG. 1;

Description of the preferred embodiments

Figure 4:
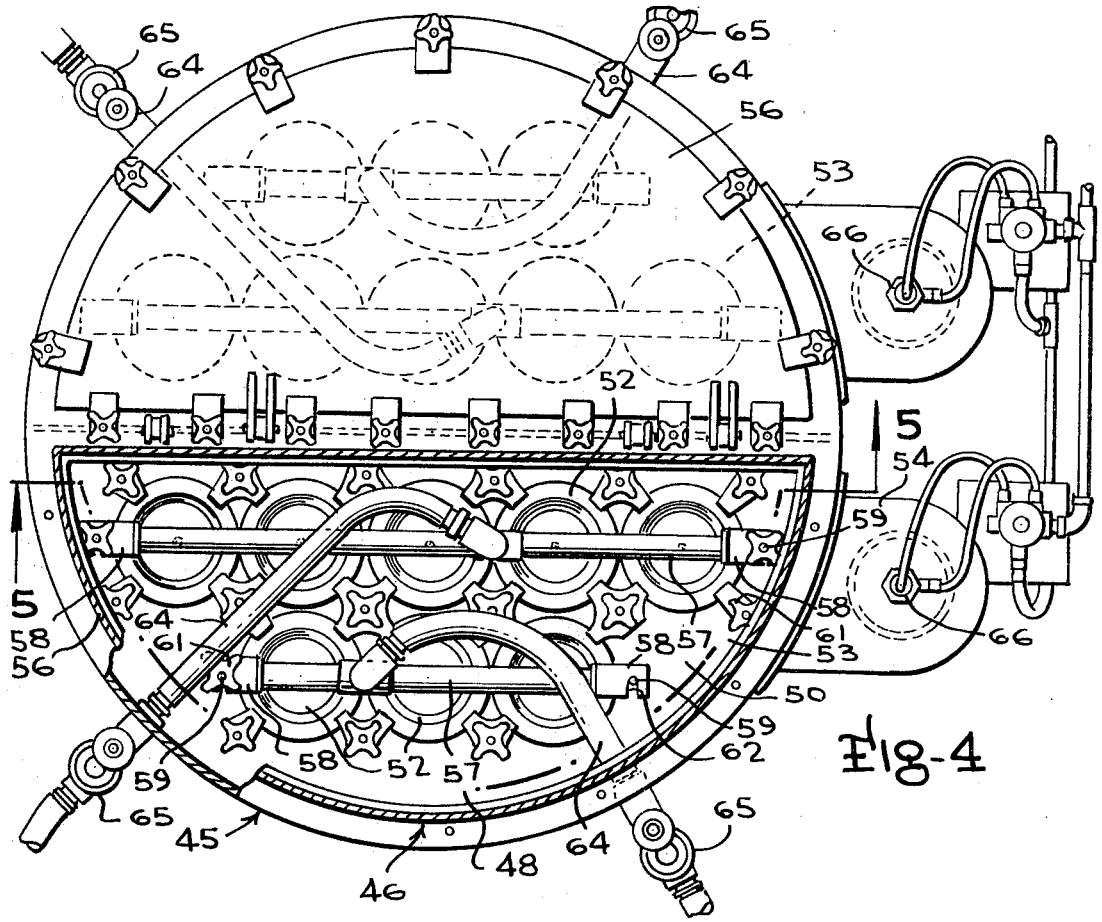
FIG. 4 is a top plan view of another form of filter collector, parts being broken away to show interior structure.

Referring to the drawings in detail, and first to that form of the invention shown in FIGS. 1, 2 and 3, there is shown a filter collector 1 which includes a casing 2 having a cylindrical upper portion 3 and a downwardly converging lower section 4. Near the top there is a horizontally extending tube sheet 5, which divides the casing into a lower receiving chamber 6 and an upper plenum chamber 7. The tube sheet has a plurality of openings 8 to receive filter tubes 9. Particle laden air enters the receiving chamber by means of an inlet pipe 10, and particles separated from the entraining fluid drop to the bottom of the chamber 6 for removal through a bottom outlet 11. The entraining fluid, gas or air, passes through the filters into the plenum chamber 7, from which it is exhausted in a manner to be described.

The filters 9 are shown as elongated tubular members, having annular castings 12 to form an open mouth and carrying cages 13 over which closed end socks 14 are drawn and secured. The castings have annular flanges 15 to seat upon the tube sheet 5 about the openings 8. Suitable clamps 16 secure the flanges in place. Normally, annular gaskets 17 are used between the flanges 15 and the tube sheet to seal the openings 9. To remove a tube, it is simply necessary to release the clamps 16 and draw the tube vertically through its opening 8 in the tube sheet.

In accordance with the present invention, the plenum chamber 7 is divided into two separate chambers 18 by means of a partition 19 which extends vertically upward from the tube sheet 5. The tubes 9 are arranged in two similar groups, one opening into one chamber 18 and the other into the other chamber 18. Each chamber 18 has an outlet chamber 20, with an outlet pipe 21 opening into the bottom wall of the chamber. Thus, the filtered entraining fluid can be exhausted from the respective plenum chambers.

The top of the casing 2 is inturned to form a peripheral top flange 22, and an inverted channel 23 is mounted on top of the partition 19 to extend diametrically across the top of the casing at the plane of the flange 22. By this arrangement, there is a horizontal, inwardly projecting flange running perimetrically around each of the separate plenum chambers 18. The plenum chambers are closed by means of doors 24 which are shaped to conform to the respective plenum chambers and overlie the flanges surrounding the chambers. Each door consists of a top 25 with a downwardly extending perimetric wall having a straight section 26, to rest upon the channel 23, and an arcuate section 27 to seat upon the circular flange 22. The doors are pivotally connected along their straight walls to the channel 23 by means of hinges 28. A gasket 29 is used between the bottom edges of the doors and the casing flanges for sealing purposes, and a plurality of quick detachable clamps 30 are mounted at spaced points around the doors to afford positive sealing around the complete perimeters of the doors.

Backwashing air lines 31 terminate in outlet pipes 32, and one of the outlet pipes projects through the top 25 of each of the doors 24 so as to be in communication with the separate plenum chambers 18.

Normal filter flow through the filter tubes and periodic backwashing of the filters are controlled by means of valves mounted in the backwash lines and plenum chamber outlets and actuated electrically through a timing device. Normal operation is to cut off normal filter flow through the tubes opening to one of the plenum chambers 18 and backwash the tubes opening to that chamber while there is normal filter flow through the tubes of the group opening into the other chamber. When the backwashing operation is completed, that group of tubes will be returned to normal filtering action. Subsequently, the tubes of the other group opening into the other plenum chamber will be backwashed.

To accomplish the desired operation, each of the air lines 31 has a solenoid operated valve 33. The solenoids 34 of the valves are connected by electric cables 35 with a suitable timing device 36. Operation of the timer will energize and de-energize solenoids 34 to open and close the valves 33 in well known manner.

The openings at the top of fluid outlet pipes 21, at their junctures with the bottom walls of the outlet chambers 20, are opened and closed by means of valves 37 to open the plenum chambers to normal filter flow or to shut them off from normal filter flow. Valves 37 have stems 38 which are piston rods of cylinder assemblies 39 mounted on the tops of the outlet chambers 20 from the plenum chambers 18. Air lines 40 extend from the opposite ends of the cylinders 39 to valves 41 which are connected in air supply line 42. Valves 41 are operated by solenoids 43 which are connected by cables 44 with the timer 36.

In operating the filter, both valves 37 will be open and outlet pipes 21 will be connected to a vacuum source. This will cause particle laden fluid to enter the receiving chamber 6 through inlet pipe 10, the entraining fluid passing through the filter socks 14 and out through the plenum chamber, while the separated particles drop to the bottom of the receiving chamber or adhere to the outer surface of the filter socks. Removal of the separated particles through the bottom outlet 11 may be done periodically, or it may be a continuous process.

In order to prevent undue build-up of particles on the filter socks, timer 36 will periodically act to energize one of the solenoids 43 to direct air from air supply line 42 through one of the air lines 40 to the top of its respective cylinder 39. This will cause the valve 37 to seat, cutting off normal filter flow through those filter elements which open into the plenum chamber emptying into the now closed outlet. Immediately following closing of the valve 37, the solenoid 34 controlling the valve 33 in the air line 31 emptying into the now closed plenum chamber 18 will be operated by the timer to open the valve and permit air from line 31 to pass through the outlet pipes 32 into the plenum chamber. As the chamber was previously under vacuum, it requires very little air pressure to expand the socks of all of the filters opening to the particular plenum chamber and dislodge the particles adhering to the outer surface of the socks. It is only necessary to keep this air line open for a few seconds, and the timer can then operate to reclose valve 33 to shut off the air supply. At the same time, the timer will actuate the solenoid 43 to cause valve 41 to close off air to the top of cylinder 39 and direct it to the bottom to lift valve 37 and again place the plenum chamber in communication with the vacuum source. The filter units communicating with the chamber will then be back in operation. After a predetermined interval, a similar operation will take place in the other half of the unit causing the filters opening to that plenum chamber to be backwashed.

With the arrangement of the present invention it is only necessary to cut off part of the filter units from normal operation during a cleaning cycle, the remainder continuing their normal operation. Due to the fact that the plenum chamber to which the filters to be cleaned open is completely cut off from the vacuum source, very little backwashing air is required and the backwashing period need be but of very short duration.

When it becomes necessary to move one or more filters for repair or replacement, the clamps 30 about the door 25 above the chamber to which the filter elements open will be removed and the door swung back about its hinges 28. There is only one air line connected to the door, and this will move with the door, permitting the door to move beyond the vertical to completely free the opening into the top of the plenum chamber. Clamps 16 retaining the particular filters to be removed can be released and the filters drawn straight through their tube sheet openings and out through the top of the plenum chamber. The filter tubes can be replaced and the collector put back in operating condition by a reversal of the operations just described.

Figure 5:
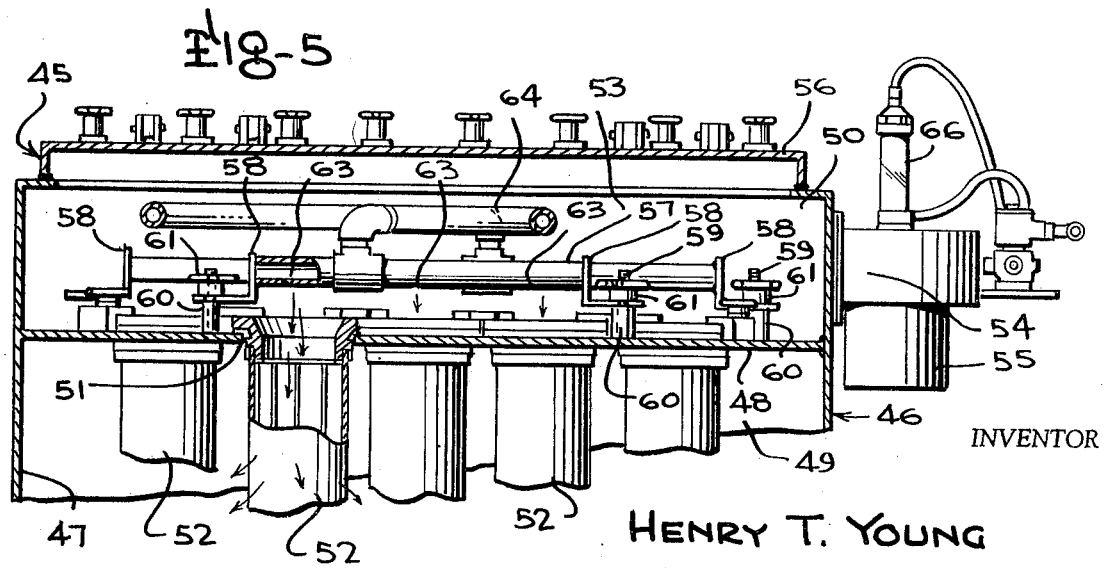
FIG. 5 is a partial vertical section taken on the line 5—5 of FIG. 4.

Referring now to that form of the invention shown in FIGS. 4 and 5, the filter collector 45, for the most part is the same as the filter collector 1 of the first-described form. The collector has a casing 46 with a cylindrical upper portion 47, across which there is a tube sheet 48 dividing the casing into a receiving chamber 49 and a plenum chamber 50. The tube sheet has openings 51 to receive filter tubes 52. The plenum chamber 50 is shown as divided into two separate chambers 53, with one half of the filters opening into one chamber and the other half opening to the other chamber. Each chamber 53 has an outlet chamber 54, with an outlet pipe 55 opening into the bottom wall of the chamber. The tops of the chambers are closed by hinged doors 56, similar to the doors in the previously described form.

It will be noted from FIG. 4 of the drawings that the filters 52 are arranged in rows in the tube sheet, and more than one row of tubes may open into each of the chambers 53. Extending longitudinally above the openings of each row of filter tubes there is a manifold 57. It will be seen from FIG. 4, that the manifolds are arranged so that they extend diametrically across the open ends of each filter of the row above which they are positioned. The manifolds may have end fittings 58 having provision to engage studs 59 projecting upwardly from tube sheet 48. Sleeves 60 may be placed about the studs to position the end fittings at desired height above the tube sheet. Suitable, quick release clamps 61 fix the manifolds in position. The fittings may have slots 62, opening to one side of the fitting, so that when the clamps 61 are released the manifolds can be moved laterally to disengage the studs. This makes unnecessary complete removal of the clamps 61 to mount, or remove, the manifolds.

Each manifold is in the form of a pipe having a plurality of outlet apertures 63 in its bottom. The apertures are so spaced, and the manifolds so mounted, that each aperture will be in axial alignment with the mouth of an underlying filter tube. Thus, there will be one aperture arranged centrally above each of the filter tubes of the row.

A flexible air line 64 is connected to each manifold, and the air lines are connected to solenoid valves 65. The solenoid valves are in a backwashing air line, and when open will supply backwashing air to the respective manifolds. Although each line has been shown connected to a separate solenoid valve 65, it will be obvious that all of the lines leading to the manifolds of a particular chamber could be connected to a single air supply valve.

Separate valves have been shown to allow for separate backwashing operations, as will be described.

The openings at the tops of fluid outlet pipes 55, at their junctures with the bottom walls of the outlet chambers 54, are opened and closed by means of valves 66 to permit normal filter flow through the plenum chambers, or to shut off normal filter flow. These valves may be identical with the valves 37 of the first-described form of the invention.

In operating the filter collector of FIGS. 4 and 5, the valves 66 will be open and outet pipes 55 will be in communication with a vacuum source to have the entire system open to normal filter flow during normal filtering operations. When it is desired to backwash the filters communicating with one plenum chamber section 53, the solenoid valves 65 connected to the air lines 64 supplying the manifolds of that section will be opened and the exhaust valve 66 for that section will be closed. This cuts off normal filter flow through the filters opening to the particular section and permits backwash air to be injected directly into the filters opening to the section. The use of multiple apertures, with one above each filter opening, allows full effect to be obtained from the backwashing air, as all of it is directed into the filter tubes themselves. Low pressure backwash air provides a very effective cleaning action with this system.

By having each manifold in a plenum chamber section 53 connected to a separate solenoid valve 65, it is possible to operate the valves in sequence while maintaining the exhaust valve 66 closed for short periods of time and obtain a very effective cleaning of the filters. When this operation is followed, less air is required for each backwash operation.

As with the first-described embodiment, the backwashing of the filters will take place in sequence with the filter elements opening in alternation to the respective plenum chamber sections being backwashed.

When it is desired to remove a filter from the embodiment of the invention shown in FIGS. 4 and 5, the door 56 is opened, the clamps 61 holding the manifolds 57 are loosened and the manifolds removed, leaving the filters free of obstruction. The filter clamps can then be removed and the filters withdrawn through the tube sheet. The filter elements can be replaced by a reversal of the procedure, and the unit is ready for operation.

While in the above practical embodiments of the invention have been disclosed, it will be understood that the particular details of construction shown and described are merely by way of illustration, and the invention may take other forms within the scope of the appended claims.

I claim:

1. A filter comprising, a casing, a tube sheet across the casing dividing the casing into a receiving chamber for particle laden gas on one side of the tube sheet and a plenum chamber for filtered gas on the other side of the tube sheet, an inlet for gas to be filtered extending into the receiving chamber, a partition in the plenum chamber from the tube sheet to an end wall of the casing dividing the plenum chamber into compartments, filter bags closed at the bottom and mounted on the tube sheet and extending into the receiving chamber with open ends in communication with the plenum chamber with groups of filter bags arranged in rows respectively in communication with each plenum chamber compartment, a separate outlet for filtered gas from each plenum chamber compartment, closure valves across each compartment outlet, a separate manifold pipe for filter cleaning gas under pressure overlying each row of filter bags in each plenum chamber compartment with outlets from the manifolds located centrally over each filter bag, gas supply lines connected to each manifold, a valve in each supply line, means to automatically open and close each plenum chamber closure valve, means to open and close each fluid supply valve, and means to automatically control the operation of the closure valves and the fluid supply valve of each plenum chamber compartment simultaneous in opposite phase and the valves of the respective chambers in predetermined sequence.

2. A filter as claimed in claim 1 wherein, at least a part of each supply line adjacent a manifold is flexible, the manifolds are releasbly secured to the tube sheet, and the housing has a removable door over each plenum chamber compartment, whereby the door and the manifolds of each plenum chamber compartment may be removed to allow for changing filter bags through the open door.

References Cited

UNITED STATES PATENTS

| | | | |
|---|---|---|---|
| 1,784,339 | 12/1930 | Clasen et al. | 55—341 |
| 2,974,748 | 3/1961 | Swanson | 55—341 |
| 3,057,137 | 10/1962 | Perlis et al. | 55—303 |
| 3,204,390 | 9/1965 | Heyl | 55—341 |
| 3,368,328 | 2/1968 | Reinauer | 55—96 |
| 3,377,783 | 4/1968 | Young | 55—302 |
| 3,385,033 | 5/1968 | Bashore et al. | 55—302 |
| 3,390,512 | 7/1968 | Hanes | 55—96 |
| 3,394,532 | 7/1968 | Oetiker | 55—302 |
| 3,421,295 | 1/1969 | Swift et al. | 55—302 |

FOREIGN PATENTS

| | | |
|---|---|---|
| 1,239,745 | 7/1960 | France. |
| 788,166 | 12/1957 | Great Britain. |

OTHER REFERENCES

"The Mikro-Pulsaire Dust Collector," Pulverizing Machinery Bulletin PC–1, New Jersey, 1-66, pp. 1-12.

HARRY B. THORNTON, Primary Examiner

B. NOZICK, Assistant Examiner

U.S. Cl. X.R.

55—302, 341, 379, 481